(12) United States Patent
Koga et al.

(10) Patent No.: US 6,758,889 B2
(45) Date of Patent: Jul. 6, 2004

(54) INK FOR INK-JET RECORDING

(75) Inventors: Narumi Koga, Nagoya (JP); Kazuma Goto, Nagoya (JP); Naomichi Kobayashi, Nagoya (JP); Michiko Aoyama, Nagoya (JP); Shunichi Higashiyama, Yotsukaichi (JP); Masaya Fujioka, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 43 days.

(21) Appl. No.: 10/101,376

(22) Filed: Mar. 20, 2002

(65) Prior Publication Data

US 2003/0032697 A1 Feb. 13, 2003

(30) Foreign Application Priority Data

Mar. 23, 2001 (JP) ........................................ 2001-085937

(51) Int. Cl.⁷ .............................................. C09D 11/02
(52) U.S. Cl. .................................. 106/31.43; 106/31.75
(58) Field of Search ........................ 106/31.43, 31.75, 106/31.58, 31.59, 31.86, 31.89

(56) References Cited

U.S. PATENT DOCUMENTS

| | | | |
|---|---|---|---|
| 5,594,044 A | * | 1/1997 | Yang .......................... 523/160 |
| 5,785,745 A | * | 7/1998 | Lauw et al. .............. 106/31.27 |
| 6,036,759 A | * | 3/2000 | Wickramanayake et al. ..... 106/31.28 |
| 6,048,390 A | * | 4/2000 | Yano et al. ............... 106/31.43 |
| 6,264,731 B1 | * | 7/2001 | Gundlach et al. ........ 106/31.58 |
| 6,500,880 B1 | * | 12/2002 | Parazak ...................... 523/160 |
| 2002/0038614 A1 | * | 4/2002 | Momose .................. 106/31.75 |
| 2002/0040660 A1 | * | 4/2002 | Momose .................. 106/31.75 |
| 2002/0139280 A1 | * | 10/2002 | Ichikawa ................. 106/31.43 |
| 2003/0079647 A1 | * | 5/2003 | Kaneko et al. .......... 106/31.43 |

FOREIGN PATENT DOCUMENTS

| | | |
|---|---|---|
| JP | A 62-101672 | 5/1987 |
| JP | A 5-293976 | 11/1993 |

OTHER PUBLICATIONS

McCutcheon's Detergents & Emulsifier, 1972, Allured Publishing Corp., p. 71.*

* cited by examiner

Primary Examiner—Mark L. Bell
Assistant Examiner—Veronica F. Faison
(74) Attorney, Agent, or Firm—Oliff & Berridge, PLC

(57) ABSTRACT

An ink for ink-recording is provided, which makes it possible to reduce color bleed while suppressing even when recording is performed on regular paper. The ink for ink-jet recording contains water, a coloring agent, a water-soluble organic solvent, and a compound represented by the following general formula (1):

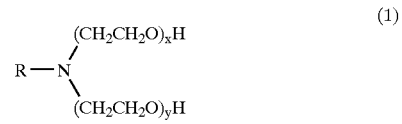

wherein R represents a alkyl group having a number of carbons of 8 to 18, and x+y is not more than 10. A surface tension of the ink is controlled to 31 to 35 mN/m, which can reduce color bleed and feathering.

16 Claims, 1 Drawing Sheet

INK FOR INK-JET RECORDING

BACKGROUND OF THE INVENTION

1. Field of the Invention

The present invention relates to a recording ink for an ink-jet printer, and specifically the recording ink with which color bleed and feathering can be reduced.

2. Description of the Related Art

The ink discharge system, which has been hitherto known for the ink-jet recording system, includes, for example, the electrostatic attraction system, the system in which mechanical vibration or displacement is applied to the ink by using a piezoelectric element or the like, and the method in which bubbles are generated by heating the ink to utilize the pressure generated thereby. Ink droplets are formed by means of the discharge system as described above, and all or a part of the droplets are adhered to a recording objective such as paper to perform the recording. Those known and used as the ink to be employed for the ink-jet recording system as described above include those in which a variety of water-soluble dyes or pigments are dissolved or dispersed in liquid media each comprising water or a combination of water and water-soluble organic solvent.

In order to adequately perform the recording for a long period of time by using the ink as described above, for example, the following conditions are required. That is, the characteristic values including, for example, the viscosity, the surface tension, the electric conductivity, and the density of the ink to be used are appropriate values. In order to avoid any clog-up at the nozzle or the orifice of the recording apparatus, no deposited matter is generated and no physical property value is changed by the influence of heat or the like. Further, the recorded image is excellent, for example, in water resistance and light resistance. A large number of suggestions have been made in order to satisfy the conditions as described above.

However, in recent years, it is more demanded to perform the recording on the regular paper rather than on the exclusive ink-jet paper in view of the cost and the consideration of the environment. In the case of most of the conventional inks, when the recording is performed on the regular paper, then the blur (feathering) is apt to occur at the ink edge, and the color bleed is apt to occur, which is caused such that the inks of different colors are mixed with each other at portions at which the different colors are adjacent to one another. As a result, a problem arises in that the printing quality is deteriorated.

In order to avoid the occurrence of the feathering and the color bleed, a method may be employed, in which the surface tension of the ink is lowered to increase the permeation speed of the ink. As for such a method, as described in Japanese Patent Application Laid-Open No. 5-293976, a method has been suggested, in which acetylene glycol is used. However, when this substance is added in an adequate amount, the surface tension of the ink is consequently adjusted to be not more than 30 mN/m. In the case of such an ink in which the surface tension is too low, the blur on the paper is increased. Further, the performance such as the landing accuracy is consequently lowered when the ink is discharged from the head. The reliability of the discharge mechanism may be possibly lowered as well.

SUMMARY OF THE INVENTION

The present invention has been made in order to solve the problem as described above, an object of which is to provide an ink for ink-jet recording with which the color bleed is successfully reduced while suppressing the feathering even when the ink is used for recording on the regular paper.

According to a first aspect of the present invention, there is provided an ink for ink-jet recording comprising:
water;
a coloring agent;
a water-soluble organic solvent; and
a compound represented by the following general formula (1):

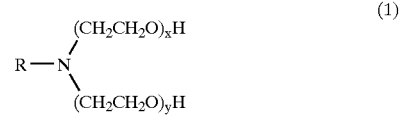

wherein R represents an alkyl group having a number of carbons of 8 to 18, and $x+y \leq 10$ is satisfied. The ink of the present invention may include a variety of compounds each of which is represented by the formula (1). The compound may be contained by 0.01 to 5% by weight in the ink. It is preferable that the compound is contained in an amount so that the surface tension of the ink is 31 to 35 mN/m. The surface tension referred to herein resides in a value measured at 25° C.

According to a second aspect of the present invention, there is provided an ink set for ink-jet recording having a combination of inks of different colors, comprising:
a first ink including water, a first coloring agent, and a water-soluble organic solvent; and
a second ink including water, a second coloring agent, and a water-soluble organic solvent;
each of the first and second inks containing a compound represented by the following general formula (1):

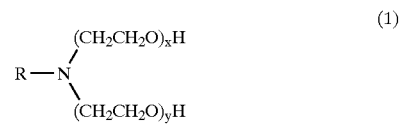

wherein R represents an alkyl group having a number of carbons of 8 to 18, and $x+y \leq 10$ is satisfied.

The ink for ink-jet recording of the present invention contains at least water, the coloring agent, and the water-soluble organic solvent. The water to be used in the present invention is not specifically limited. However, it is preferable to use water having high purity such as ion exchange water and distilled water excluding, for example, tap water.

The content of the water may be determined depending on the type and the composition of the coloring agent and the water-soluble organic solvent or the characteristics of the desired ink. However, in general, it is preferable that the content is 10 to 98% by weight with respect to the total weight of the ink. If the content is less than 10% by weight, then the viscosity of the ink is too high, and it is difficult to discharge the ink from the head. If the content exceeds 98% by weight, the ink is apt to be dried. The content is more preferably 30 to 97% by weight, and much more preferably 40 to 95% by weight.

Those usable as the coloring agent to be used in the present invention include, for example, dyes and pigments.

Those usable as the dye include, for example, water-soluble dyes represented by direct dye, acidic dye, basic dye, and reactive dye. The water-soluble dye is not specifically limited. However, it is preferable to use those which are adequate for the ink to be used for the ink-jet recording system and which satisfy required performance such as vividness, water solubility, stability, light resistance, and other required performance, including, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2.

The pigment is not specifically limited provided that the pigment is capable of being dispersed in the aqueous phase. The pigment includes, for example, azo pigment such as azo lake, insoluble azo pigment, condensed azo pigment, and chelate azo pigment; polycyclic pigment such as phthalocyanine pigment, perylene, perynone pigment, anthraquinone pigment, quinacridone pigment, dioxazine pigment, thioindigo pigment, isoindolinone pigment, and quinophthalone pigment; dye lake such as basic dye type lake and acidic dye type lake; organic pigment such as nitro pigment, nitroso pigment, and aniline black daylight fluorescent pigment; and inorganic pigment such as titanium oxide, iron oxide-based pigment, and carbon black-based pigment. For example, those obtained by applying a surface treatment to the various pigments described above, for example, with a surfactant or a macromolecular dispersing agent can be also used as the pigment to be used in the present invention. Such a material includes, for example, graft carbon.

When the pigment as described above is used as the coloring agent to be used in the present invention, a dispersing treatment is performed in accordance with a conventionally known method together with an appropriate dispersing agent, a solvent, pure water, and optionally other additives. Those usable as the dispersing agent include, for example, a surfactant and a macromolecular dispersing agent to be used to disperse the pigment as described in Japanese Laid-Open Patent Publication No. 62-101672.

The macromolecular dispersing agent is not specifically limited, including, for example, protein such as gelatin and albumin; natural rubber such as gum arabic and gum traganth; glucoside such as saponin; cellulose derivative such as methyl cellulose, carboxy cellulose, and hydroxymethyl cellulose; natural macromolecule such as lignosulfonate and shellac; anionic macromolecule such as salt of polyacrylic acid, salt of styrene-acrylic acid copolymer, salt of vinylnaphthalene-acrylic acid copolymer, salt of styrene-maleic acid copolymer, salt of vinylnaphthalene-maleic acid copolymer, and sodium salt and phosphoric acid salt of β-naphthalenesulfonic acid-formalin condensate; and nonionic macromolecule such as polyvinyl alcohol, polyvinyl pyrrolidone, and polyethylene glycol.

The surfactant includes, for example, anionic surfactant such as higher alcohol sulfuric acid ester salt, liquid fatty oil sulfuric acid ester salt, and alkylarylsulfonic acid salt; and nonionic surfactant such as polyoxyethylene alkyl ether, polyoxyethylene alkyl ester, sorbitan alkyl ester, and polyoxyethylene sorbitan alkyl ester.

The dispersing agent may be used singly, or two or more of the dispersing agents may be used in combination. It is preferable that the dispersing agent is generally blended in an amount of 0.01 to 20% by weight with respect to the total weight of the ink. If the blending amount is less than 0.01% by weight, an effect such as adjustment of surface tension or the like is not sufficiently expressed. If the blending amount exceeds 20% by weight, then the effect is not only enhanced, but also any harmful influence such as increase in ink viscosity appears.

The dispersing machine, which is used for the dispersing treatment for the pigment as described above, is not specifically limited. It is possible to widely use general dispersing machines. However, the dispersing machine includes, for example, ball mills, roll mills, and sand mills. Especially, it is preferable to use a high speed type sand mill.

The dye and the pigment may be used singly respectively. Alternatively, two or more dyes, two or more pigments, or two or more dyes and pigments may be mixed and used.

It is preferable that the content of the coloring agent is generally 0.1 to 20% by weight with respect to the total weight of the ink. If the content is less than 0.1% by weight, it is difficult to sufficiently develop the color on the regular paper. If the content exceeds 20% by weight, the coloring agent is deposited and/or aggregated in the ink in some cases. The content is more preferably 0.3 to 1.5% by weight, and much more preferably 0.5 to 10% by weight.

The water-soluble organic solvent to be used in the present invention is not specifically limited, including, for example, alkyl alcohol having a number of carbon or carbons of 1 to 5 such as methyl alcohol, ethyl alcohol, n-propyl alcohol, and n-butyl alcohol; amide such as dimethylformamide and dimethylacetoamide; ketone or ketone alcohol such as acetone and diacetone alcohol; ether such as tetrahydrofuran and dioxane; alkylene glycol containing alkylene group having a number of carbons of 2 to 6 such as ethylene glycol, propylene glycol, triethylene glycol, and diethylene glycol; glycerol; polyalkylene glycol such as polyethylene glycol and polypropylene glycol; lower monoalkyl ether of polyhydric alcohol such as ethylene glycol monomethyl (or ethyl) ether, diethylene glycol monomethyl (or ethyl) ether, and triethylene glycol monomethyl (or ethyl) ether; lower dialkyl ether of polyhydric alcohol such as triethylene glycol dimethyl (or ethyl) ether; sulfolane, pyrrolidone, N-methyl-2-pyrrolidone, 1,3-dimethyl-2-imidazolidinone, and 1,5-pentanediol. The water-soluble organic solvent as described above may be used singly. Alternatively, two or more of the water-soluble organic solvents as described above may be used in combination. When two or more species of the water-soluble organic solvents are used in combination, the blending ratio may be determined within a wide range depending on the composition of the ink and the characteristics of the desired ink. However, when two or more species of the water-soluble organic solvents are used in combination, in general, the blending ratio is preferably 0:100 to 40:60 and more preferably 5:95 to 30:70 as converted and calculated in weight.

The ink for ink-jet recording of the present invention contains, as an essential component, the compound represented by the general formula (1) in addition to water, the coloring agent, and the water-soluble organic solvent. When the compound represented by the general formula (1) is used, the surface tension of the ink can be regulated to be 31 to 35 mN/m as a range in which the color bleed can be reduced while suppressing the feathering even when the ink is used for the regular paper, unlike a case in which acetylene glycol is used.

In the general formula (1) described above, R is the alkyl group having a number of carbons of B to 18. Preferably, the number of carbons is 12 to 18. The symbols x, y represent the numbers of structural units, and x+y is not more than 10. If the chain length of the polyoxyethylene group is too long, then the surface tension of the ink cannot be lowered, and the printing quality is deteriorated. Preferably, x+y is 2 to 7. As for the compound represented by the general formula (1), it is preferable that a variety of the compounds are included in a form of mixture or composition. The optimum number of carbons of the alkyl group is considered to be different depending on the quality of the printing paper onto which the ink is jetted. Therefore, when the ink contains a plurality of the compounds having alkyl groups with a variety of numbers of carbons in mixture, the ink may be conformed to any type of paper. The compound represented by the general formula (1) is generally a compound contained in natural matters such as coconut oil, beef tallow, and soybean oil. The compounds, which have alkyl groups with different numbers of carbons and which have different (x+y) values, are present and distributed in a variety of ratios in the oils or fats as described above. Accordingly, it is convenient to use products derived from the oils and fats as described above.

Those usable as the product containing the compound represented by the general formula (1) include, for example, Ethomeen C12, C15 derived from coconut oil; T12, T15 derived from beef tallow; S12, S15 derived from soybean oil; and O12 derived from oleic acid. Any one of the products described above is available from Lion Corporation. Ethomeen C12, C15 satisfy x+y=2 and x+y=5 respectively, each of which contains a major component of the compound represented by the formula (1) having the number of carbons of 11 of the alkyl group. Each of T12, T15, S12, S15 contains a major component of the compound represented by the formula (1) having the number of carbons of 17 of the alkyl group. Almost all parts of O12 are occupied by the compound represented by the formula (1) having the number of carbons of 17 of the alkyl group. In the present invention, it is preferable to use Ethomeen C12, C15.

It is preferable that the content of the compound represented by the general formula (1) is 0.01 to 5% by weight with respect to the total weight of the ink. If the content is less than 0.01% by weight, then the surface tension of the ink is too high, and the color bleed occurs in some cases. If the content exceeds 5% by weight, the surface tension of the ink is too low. As a result, the penetration speed of the ink is too fast, and the feathering occurs in some cases. More preferably, the content is 0.1 to 3% by weight.

As for the ink for ink-jet recording of the present invention, the surface tension is 31 to 35 mN/m. If the surface tension is less than 31 mN/m, then the osmotic power into the paper is too strong, and it is impossible to ensure an enough concentration for an image. Further, it is impossible to sufficiently ensure the reliability of the discharge mechanism as well. On the other hand, if the surface tension exceeds 35 mN/m, the effect on the color bleed is low. Further, for example, a harmful influence arises such that the drying time of the ink on the recording paper is long. Preferably, the surface tension is 32 to 34 mN/m.

In the ink for ink-jet recording of the present invention, the surface tension can be adjusted to 31 to 35 mN/m with the content of the compound represented by the general formula (1).

Further, the ink for ink-jet recording of the present invention may contain polyoxyalkylene glycol-n-alkyl ether in order to further suppress the color bleed. As for the polyoxyalkylene glycol-n-alkyl ether to be used in the present invention, it is preferable that the number of carbon or carbons of the alkyl group is not more than 5, and the number of carbon or carbons of the oxyalkylene group is not more than 12. Those having a long molecular chain are not suitable for the material for the ink for ink-jet recording, because the viscosity is extremely increased. The polyoxyalkylene glycol-n-alkyl ether includes glycol ethers represented by alkyl ethers based on ethylene glycol and propylene glycol.

The compound based on ethylene glycol includes, for example, ethylene glycol-n-methyl ether, ethylene glycol-n-ethyl ether, ethylene glycol-n-propyl ether, ethylene glycol-n-butyl ether, ethylene glycol-n-isobutyl ether, diethylene glycol-n-methyl ether, diethylene glycol-n-ethyl ether, diethylene glycol-n-propyl ether, diethylene glycol-n-butyl ether, diethylene glycol-n-isobutyl ether, triethylene glycol-n-methyl ether, triethylene glycol-n-ethyl ether, triethylene glycol-n-propyl ether, triethylene glycol-n-butyl ether, and triethylene glycol-n-isobutyl ether.

The compound based on propylene glycol includes, for example, propylene glycol-n-methyl ether, propylene glycol-n-ethyl ether, propylene glycol-n-propyl ether, propylene glycol-n-isopropyl ether, propylene glycol-n-butyl ether, dipropylene glycol-n-methyl ether, dipropylene glycol-n-ethyl ether, dipropylene glycol-n-propyl ether, dipropylene glycol-n-isopropyl ether, dipropylene glycol-n-butyl ether, tripropylene glycol-n-methyl ether, tripropylene glycol-n-ethyl ether, tripropylene glycol-n-propyl ether, tripropylene glycol-n-isopropyl ether, and tripropylene glycol-n-butyl ether.

Additionally, the ink for ink-jet recording of the present invention may optionally contain, for example, hitherto known various types of dispersing agents, surfactants, viscosity-adjusting agents, surface tension-adjusting agents, pH-adjusting agents, antiseptic agents, and fungicides.

When the ink for ink-jet recording of the present invention is used for the ink-jet recording method of the type in which the recording liquid is electrically charged, it is also preferable to contain specific resistance-adjusting agents including, for example, inorganic salts such as lithium chloride, ammonium chloride, and sodium chloride.

Further, when the ink for ink-jet recording of the present invention is used for the ink-jet system of the type in which the ink is discharged in accordance with the action of the thermal energy, for example, it is also preferable to adjust values of thermal physical properties including, for example, the specific heat, the coefficient of thermal expansion, and the coefficient of thermal conductivity.

The problems involved in the conventional technique are sufficiently solved in the ink for ink-jet recording of the present invention obtained as described above. The feathering and the color bleed are reduced in the ink-jet system. It is possible to provide the vivid color recording even on the regular paper.

DESCRIPTION OF THE PREFERRED EMBODIMENTS

Figure 1:
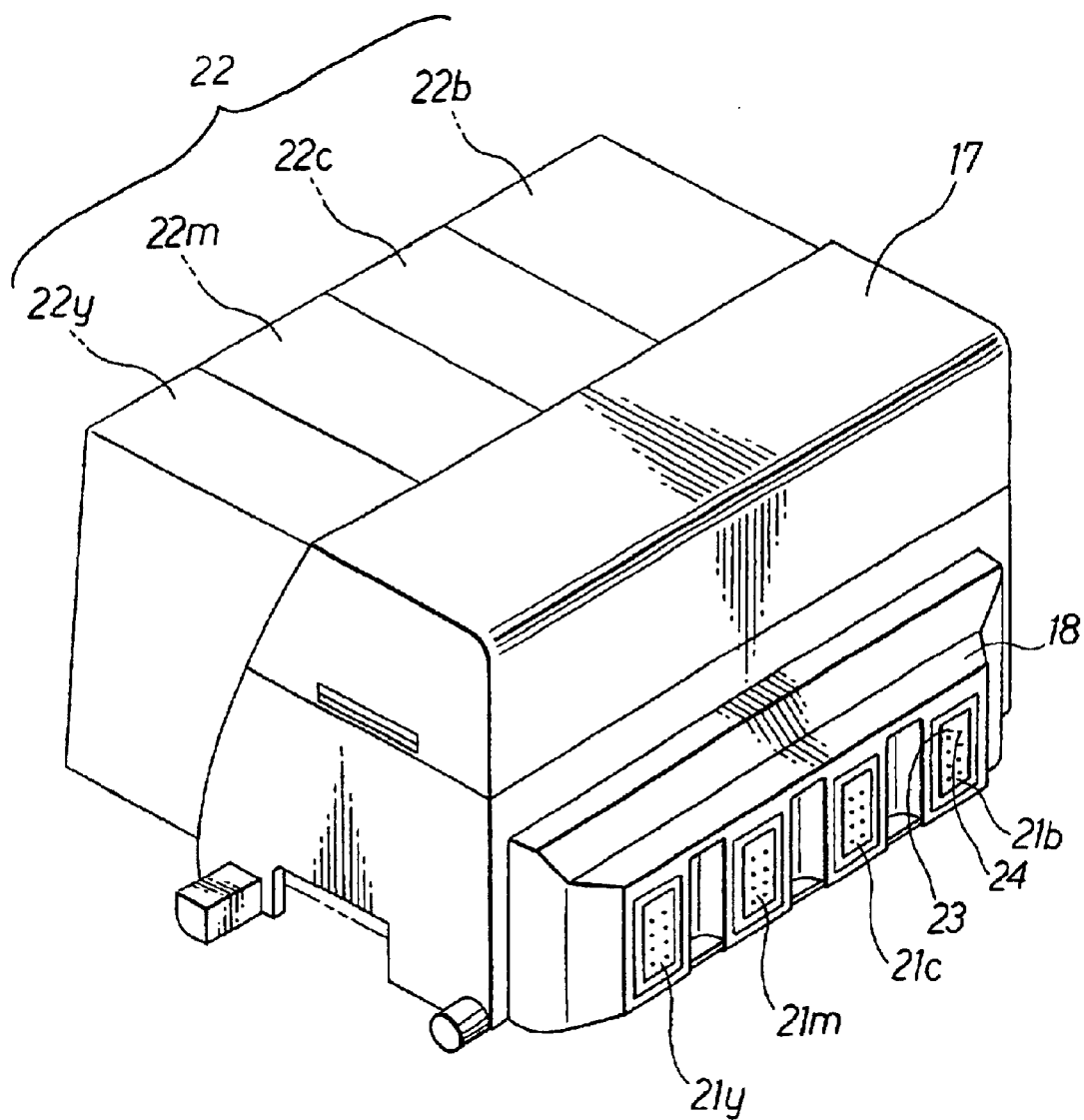
FIG. 1 shows an ink jet head which ejects four color inks and is provided with a color ink cartridge in accordance with the invention.

The present invention will be explained in further detail below as exemplified by embodiments. However, the present invention is not limited to only the embodiments.

| Composition of black ink: | |
|---|---|
| C. I. Direct Black 154 | 2 parts by weight |
| C. I. Direct Black 19 | 2 parts by weight |
| Glycerol | 23 parts by weight |
| Ethomeen C15 (R = $C_{8-18}$, x + y = 5) as compound represented by general formula (1) | 0.8 part by weight |
| Pure water | balance |
| Total | 100 parts by weight |

The surface tension of the black ink was 34.2 mN/m. The surface tension was measure at a room temperature of 25° C. by using a surface tension meter produced by Kyowa Interface Science. The measurement was also performed in the same manner as described above in Examples and Comparative Examples described below.

| Composition of cyan ink: | |
|---|---|
| C. I. Direct Blue 199 | 2 parts by weight |
| Glycerol | 25 parts by weight |
| Ethomeen C15 (R = $C_{8-18}$, x + y = 5) as compound represented by general formula (1) | 0.8 part by weight |
| Pure water | balance |
| Total | 100 parts by weight |

The surface tension of the cyan ink was 34.2 mN/m.

| Composition of magenta ink: | |
|---|---|
| C. I. Direct Red 80 | 2 parts by weight |
| Glycerol | 25 parts by weight |
| Ethomeen C15 (R = $C_{8-18}$, x + y = 5) as compound represented by general formula (1) | 0.5 part by weight |
| Pure water | balance |
| Total | 100 parts by weight |

The surface tension of the magenta ink was 34.1 mN/m.

| Composition of yellow ink: | |
|---|---|
| C. I. Direct Yellow 142 | 2 parts by weight |
| Glycerol | 25 parts by weight |
| Ethomeen C15 (R = $C_{8-18}$, x + y = 5) as compound represented by general formula (1) | 0.5 part by weight |
| Pure water | balance |
| Total | 100 parts by weight |

The surface tension of the yellow ink was 34.4 mN/m.

| Composition of black ink: | |
|---|---|
| C. I. Direct Black 154 | 2 parts by weight |
| C. I. Direct Black 19 | 2 parts by weight |
| Glycerol | 23 parts by weight |
| Ethomeen C12 (R = $C_{8-18}$, x + y = 2) as compound represented by general formula (1) | 0.3 part by weight |
| Pure water | balance |
| Total | 100 parts by weight |

The surface tension of the black ink was 33.9 mN/m.

| Composition of cyan ink: | |
|---|---|
| C. I. Direct Blue 199 | 2 parts by weight |
| Glycerol | 25 parts by weight |
| Ethomeen C12 (R = $C_{8-18}$, x + y = 2) as compound represented by general formula (1) | 0.3 part by weight |
| Pure water | balance |
| Total | 100 parts by weight |

The surface tension of the cyan ink was 33.8 mN/m.

| Composition of magenta ink: | |
|---|---|
| C. I. Direct Red 80 | 2 parts by weight |
| Glycerol | 25 parts by weight |
| Ethomeen C12 (R = $C_{8-18}$, x + y = 2) as compound represented by general formula (1) | 0.1 part by weight |
| Pure water | balance |
| Total | 100 parts by weight |

The surface tension of the magenta ink was 34.2 mN/m.

| Composition of yellow ink: | |
|---|---|
| C. I. Direct Yellow 142 | 2 parts by weight |
| Glycerol | 25 parts by weight |
| Ethomeen C12 (R = $C_{8-18}$, x + y = 2) as compound represented by general formula (1) | 0.1 part by weight |
| Pure water | balance |
| Total | 100 parts by weight |

The surface tension of the yellow ink was 33.8 mN/m.

| Composition of black ink: | |
|---|---|
| C. I. Direct Black 154 | 2 parts by weight |
| C. I. Direct Black 19 | 2 parts by weight |
| Glycerol | 18 parts by weight |
| Triethylene glycol-n-butyl ether | 5 parts by weight |
| Ethomeen C15 (R = $C_{8-18}$, x + y = 5) as compound represented by general formula (1) | 0.5 part by weight |
| Pure water | balance |
| Total | 100 parts by weight |

The surface tension of the black ink was 32.3 mN/m.

| Composition of cyan ink: | |
| --- | --- |
| C. I. Direct Blue 199 | 2 parts by weight |
| Glycerol | 20 parts by weight |
| Triethylene glycol-n-butyl ether | 5 parts by weight |
| Ethomeen C15 (R = $C_{8-18}$, x + y = 5) as compound represented by general formula (1) | 0.5 part by weight |
| Pure water | balance |
| Total | 100 parts by weight |

The surface tension of the cyan ink was 31.9 mN/m.

| Composition of magenta ink: | |
| --- | --- |
| C. I. Direct Red 80 | 2 parts by weight |
| Glycerol | 20 parts by weight |
| Triethylene glycol-n-butyl ether | 5 parts by weight |
| Ethomeen C15 (R = $C_{8-18}$, x + y = 5) as compound represented by general formula (1) | 0.2 part by weight |
| Pure water | balance |
| Total | 100 parts by weight |

The surface tension of the magenta ink was 31.5 mN/m.

| Composition of yellow ink: | |
| --- | --- |
| C. I. Direct Yellow 142 | 2 parts by weight |
| Glycerol | 20 parts by weight |
| Triethylene glycol-n-butyl ether | 5 parts by weight |
| Ethomeen C15 (R = $C_{8-18}$, x + y = 5) as compound represented by general formula (1) | 0.2 part by weight |
| Pure water | balance |
| Total | 100 parts by weight |

The surface tension of the yellow ink was 31.4 mN/m.

COMPARATIVE EXAMPLE 1

Black Ink:

An ink was prepared in the same manner as described above except that 0.8 part by weight of the compound represented by the general formula (1) was not blended in the black ink in Example 1. The surface tension was 59.2 mN/m.

Cyan Ink:

An ink was prepared in the same manner as described above except that 0.8 part by weight of the compound represented by the general formula (1) was not blended in the cyan ink in Example 1. The surface tension was 61.2 mN/m.

Magenta Ink:

An ink was prepared in the same manner as described above except that 0.5 part by weight of the compound represented by the general formula (1) was not blended in the magenta ink in Example 1. The surface tension was 66.7 mN/m.

Yellow Ink:

An ink was prepared in the same manner as described above except that 0.5 part by weight of the compound represented by the general formula (1) was not blended in the yellow ink in Example 1. The surface tension was 69.8 mN/m.

COMPARATIVE EXAMPLE 2

Black Ink:

An ink was prepared in the same manner as described above except that 0.8 part by weight of the compound represented by the general formula (1) was replaced with 0.8 part by weight of a material (R=$C_{8-18}$, x+y=15) in the black ink in Example 1. The surface tension was 36.2 mN/m.

Cyan Ink:

An ink was prepared in the same manner as described above except that 0.8 part by weight of the compound represented by the general formula (1) was replaced with 0.8 part by weight of a material (R=$C_{8-18}$, x+y=15) in the cyan ink in Example 1. The surface tension was 38.9 mN/m.

Magenta Ink:

An ink was prepared in the same manner as described above except that 0.5 part by weight of the compound represented by the general formula (1) was replaced with 0.5 part by weight of a material (R=$C_{8-18}$, x+y=15) in the magenta ink in Example 1. The surface tension was 37.7 mN/m.

Yellow Ink:

An ink was prepared in the same manner as described above except that 0.5 part by weight of the compound represented by the general formula (1) was replaced with 0.5 part by weight of a material (R=$C_{8-18}$, x+y=15) in the yellow ink in Example 1. The surface tension was 37.8 mN/m.

COMPARATIVE EXAMPLE 3

Black Ink:

An ink was prepared in the same manner as described above except that 0.8 part by weight of the compound represented by the general formula (1) was replaced with 0.8 part by weight of a material (R=$C_{14-22}$, x+y=15) in the black ink in Example 1. The surface tension was 38.2 mN/m.

Cyan Ink:

An ink was prepared in the same manner as described above except that 0.8 part by weight of the compound represented by the general formula (1) was replaced with 0.8 part by weight of a material (R=$C_{14-22}$, x+y=15) in the cyan ink in Example 1. The surface tension was 38.2 mN/m.

Magenta Ink:

An ink was prepared in the same manner as described above except that 0.5 part by weight of the compound represented by the general formula (1) was replaced with 0.5 part by weight of a material (R=$C_{14-22}$, x+y=15) in the magenta ink in Example 1. The surface tension was 38.4 mN/m.

Yellow Ink:

An ink was prepared in the same manner as described above except that 0.5 part by weight of the compound represented by the general formula (1) was replaced with 0.5 part by weight of a material (R=$C_{14-22}$, x+y=15) in the yellow ink in Example 1. The surface tension was 37.8 mN/m.

COMPARATIVE EXAMPLE 4

Black Ink:

An ink was prepared in the same manner as described above except that 0.8 part by weight of the compound represented by the general formula (1) was replaced with 0.8 part by weight of acetylene glycol in the black ink in Example 1. The surface tension was 29.5 mN/m.

Cyan Ink:

An ink was prepared in the same manner as described above except that 0.8 part by weight of the compound represented by the general formula (1) was replaced with 0.8 part by weight of acetylene glycol in the cyan ink in Example 1. The surface tension was 28.8 mN/m.

Magenta Ink:

An ink was prepared in the same manner as described above except that 0.5 part by weight of the compound represented by the general formula (1) was replaced with 0.5 part by weight of acetylene glycol in the magenta ink in Example 1. The surface tension was 29.4 mN/m.

Yellow Ink:

An ink was prepared in the same manner as described above except that 0.5 part by weight of the compound represented by the general formula (1) was replaced with 0.5 part by weight of acetylene glycol in the yellow ink in Example 1. The surface tension was 29.3 mN/m.

Evaluation of Performance

The respective materials described above were sufficiently mixed and agitated for the inks of Examples 1 to 3 and Comparative Examples 1 to 4, followed by performing filtration with a membrane filter of 0.8 μm to use the obtained inks for evaluating the recording therewith.

The black ink, the cyan ink, the magenta ink, and the yellow ink were subjected to the recording by using MFC-7150C (ink-jet printer produced by BROTHER INDUSTRIES, LTD.). The recording was performed by combining the colors so that the inks having the two different colors formed the letter color and the background color respectively on recording samples. The evaluation was directed to the blur at the boundary at which the colors were mixed with each other and to the distinction of letters. Letters, which were recorded without any background of each of the colors, were used for a recording sample to serve as an evaluation standard. As for the dimension of the recorded letters, the letter size was set to 11 with Microsoft Word 97. The recording was performed on the regular paper (Xerox 4200) by using MFC-7150C. The recording was performed in the same manner as described above with the respective colors of the comparative inks.

Next, the method for evaluating the recording samples subjected to the recording will be described below. The evaluation criterion was based on the degree of blur of the letters with the background as compared with the letters with no background in accordance with visual evaluation. The evaluation criterion is as follows:

++: the color bleed is scarcely observed, and the equivalent vividness is obtained as compared with the letters with no background;

+: the color bleed is slightly generated as compared with the letters with no background, but the letters are sufficiently readable;

±: the color bleed is clearly generated as compared with the letters with no background, but the letters are readable; and −: the color bleed is clearly generated as compared with the letters with no background, and the letters are difficult to be read as well. Table 1 shows results of the evaluation of the recording samples based on the use of the respective inks.

TABLE 1

|  | Example | | | Comparative Example | | | |
|---|---|---|---|---|---|---|---|
|  | 1 | 2 | 3 | 1 | 2 | 3 | 4 |
| Black letter x no background | ++ | ++ | + | − | ± | ± | − |
| Cyan letter x no background | ++ | ++ | + | − | ± | ± | − |
| Magenta letter x no background | ++ | ++ | + | − | ± | ± | − |
| Yellow letter x no background | ++ | ++ | + | − | ± | ± | − |
| Black letter x cyan background | + | + | ++ | − | − | ± | − |
| Black letter x magenta background | + | + | ++ | − | − | ± | − |
| Black letter x yellow background | + | + | ++ | − | − | ± | − |
| Cyan letter x black background | + | + | ++ | − | − | ± | − |
| Cyan letter x magenta background | + | + | ++ | − | ± | − | ± |
| Cyan letter x yellow background | + | + | ++ | − | ± | − | ± |
| Magenta letter x black background | + | + | ++ | − | − | ± | − |
| Magenta letter x cyan background | + | + | ++ | − | ± | − | ± |
| Magenta letter x yellow background | + | + | ++ | − | ± | − | ± |
| Yellow letter x black background | + | + | ++ | − | − | ± | ± |
| Yellow letter x cyan background | + | + | ++ | − | ± | − | ± |
| Yellow letter x magenta background | + | + | ++ | − | ± | − | ± |

As shown in Table 1, the blur due to the color bleed was scarcely observed when the inks of the present invention of Examples 1 to 3 were used. In Example 3, the effect to suppress the color bleed is better than those in Examples 1 and 2, because triethylene glycol-n-butyl ether is contained in Example 3.

An embodiment of an ink cartridge which contains the ink or ink set in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet.

The ink and ink set of the present invention has been explained above. According to the ink and ink set of the present invention, it is possible to perform the vivid color recording by reducing the color bleed while suppressing the feathering ever when the recording is performed on the regular paper.

What is claimed is:

1. An ink for ink-jet recording comprising:
    water;
    a coloring agent;
    a water-soluble organic solvent; and
    a compound represented by the following general formula (1):

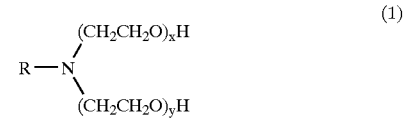

wherein R represents an alkyl group having a number of carbons of 8 to 18, and $x+y \leq 10$ is satisfied.

2. The ink according to claim 1, wherein the compound is contained as a mixture comprised of different compounds each of which is represented by the formula (1).

3. The ink according to claim 1, wherein the compound is contained by 0.01 to 5% by weight in the ink.

4. The ink according to claim 1, wherein a surface tension of the ink is 31 to 35 mN/m.

5. The ink according to claim 1, further comprising polyoxyalkylene glycol-n-alkyl ether.

6. The ink according to claim 1, wherein x+y=2 or x+y=5 is satisfied for the formula.

7. The ink according to claim 1, wherein the compound is a component extracted from a substance selected from the group consisting of coconut oil, beef tallow, soybean oil, and oleic acid.

8. An ink set for ink-jet recording having a combination of inks of different colors, comprising:

a first ink including water, a first coloring agent, and a water-soluble organic solvent; and a second ink including water, a second coloring agent, and a water-soluble organic solvent;

each of the first and second inks containing a compound represented by the following general formula (1):

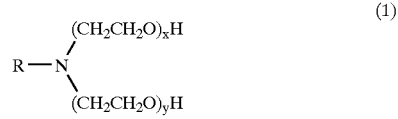

(1)

wherein R represents an alkyl group having a number of carbons of 8 to 18, and $x+y \leq 10$ is satisfied.

9. The ink set according to claim 8, wherein the first and second inks contain the compound as a mixture comprised of different compounds, each of which is represented by the formula (1).

10. The ink set according to claim 8, wherein the compound is contained by 0.01 to 5% by weight in each of the first and second inks.

11. The ink set according to claim 8, wherein a surface tension of each of the first and second inks is 31 to 35 mN/m.

12. The ink set according to claim 8, wherein each of the first and second inks comprises polyoxyalkylene glycol-n-alkyl ether.

13. The ink set according to claim 8, wherein x+y=2 or x+y=5 is satisfied for the compound contained in each of the first and second inks.

14. The ink set according to claim 8, wherein the compound is a component extracted from a substance selected from the group consisting of coconut oil, beef tallow, soybean oil, and oleic acid.

15. The ink set according to claim 8, wherein is accommodated in an ink cartridge.

16. The ink set according to claim 15, wherein the ink cartridge has a first compartment and a second compartment which contain the first ink and the second ink, respectively.

\* \* \* \* \*